United States Patent
Bryan et al.

(10) Patent No.: US 8,261,059 B2
(45) Date of Patent: Sep. 4, 2012

(54) SECURE FILE TRANSFER AND SECURE FILE TRANSFER PROTOCOL

(75) Inventors: Sean P Bryan, Colorado Springs, CO (US); Paul G Franklin, Colorado Springs, CO (US); Kenneth J Qualls, Calhan, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2461 days.

(21) Appl. No.: 10/278,990

(22) Filed: Oct. 24, 2002

(65) Prior Publication Data

US 2003/0084280 A1 May 1, 2003

Related U.S. Application Data

(60) Provisional application No. 60/347,849, filed on Oct. 25, 2001.

(51) Int. Cl.
*H04L 29/06* (2006.01)

(52) U.S. Cl. ........................................ 713/153; 380/277

(58) Field of Classification Search .................. 713/153; 380/277
See application file for complete search history.

(56) References Cited

U.S. PATENT DOCUMENTS

| | | | |
|---|---|---|---|
| 6,775,655 B1* | 8/2004 | Peinado et al. ................. 705/59 |
| 2001/0037462 A1* | 11/2001 | Bengtson ....................... 713/201 |
| 2002/0007330 A1* | 1/2002 | Kumar et al. .................... 705/36 |
| 2002/0023213 A1* | 2/2002 | Walker et al. .................. 713/168 |
| 2002/0032873 A1* | 3/2002 | Lordemann et al. ........... 713/201 |
| 2002/0059144 A1* | 5/2002 | Meffert et al. ................... 705/51 |
| 2002/0099829 A1* | 7/2002 | Richards et al. ............... 709/227 |
| 2002/0116471 A1* | 8/2002 | Shteyn .......................... 709/217 |
| 2002/0162104 A1* | 10/2002 | Raike et al. ...................... 725/31 |
| 2002/0194470 A1* | 12/2002 | Grupe ............................ 713/153 |
| 2003/0065941 A1* | 4/2003 | Ballard et al. ................. 713/201 |
| 2003/0065947 A1* | 4/2003 | Song et al. ..................... 713/201 |
| 2006/0031927 A1* | 2/2006 | Mizuno et al. .................. 726/11 |

* cited by examiner

*Primary Examiner* — Michael Pyzocha

(57) ABSTRACT

An encrypted file transfer system allows for the platform independent transfer of files and encrypting/decrypting in an integrated solution. Furthermore, the exchange of encryption keys can be handled through, for example, a secure socket connection between the client and a server thus removing the requirement of the user manually decrypting the transferred file(s).

11 Claims, 9 Drawing Sheets

| Product | File Name | Date | Size | Status | Download ... | User |
|---------|-----------|---------|-------|---------|------------|---------|
| EM | alan222_ | 2001-11-... | 11600 | DOWNLO... | 2001/11/16 | alan222 |
| EM | alan222_... | 2001-11-... | 7504 | DOWNLO... | 2001/11/16 | alan222 |
| EM | alan222_... | 2001-11-... | 13824 | DOWNLO... | 2001/11/16 | alan222 |
| EM | alan222_... | 2001-11-... | 1288 | DOWNLO... | 2001/11/16 | alan222 |
| EM | alan222_... | 2001-11-... | 14944 | NOT DO... | 2001/11/16 | alan222 |
| EM | alan222_ | 2001-11-... | 3968 | NOT DO... | 2001/11/16 | alan222 |
| EM | alan222_... | 2001-11-... | 3624 | NOT DO... | 2001/11/16 | alan222 |
| EM | alan222_... | 2001-11-... | 5816 | NOT DO... | 2001/11/16 | alan222 |
| EM | alan222_... | 2001-11-... | 1528 | NOT DO... | 2001/11/16 | alan222 |
| EM | alan222_... | 2001-11-... | 35256 | NOT DO... | 2001/11/16 | alan222 |
| EM | alan222_I... | 2001-11-... | 13280 | NOT DO... | 2001/11/16 | alan222 |
| EM | alan222_... | 2001-11-... | 2792 | NOT DO... | 2001/11/16 | alan222 |
| EM | alan222_... | 2001-11-... | 9768 | NOT DO... | 2001/11/16 | alan222 |
| EM | alan222_... | 2001-11-... | 768 | NOT DO... | 2001/11/16 | alan222 |

Fig. 7

| Product | File Name | Date | Size | Status | Download ... | User |
|---------|-----------|---------|-------|---------|------------|---------|
| EM | alan222_ | 2001-11-... | 11600 | DOWNLO... | 2001/11/16 | alan222 |
| EM | alan222_... | 2001-11-... | 7504 | DOWNLO... | 2001/11/16 | alan222 |
| EM | alan222_ | 2001-11-... | 13824 | DOWNLO... | 2001/11/16 | alan222 |
| EM | alan222_... | 2001-11-... | 1288 | DOWNLO... | 2001/11/16 | alan222 |
| EM | alan222_... | 2001-11-... | 14944 | NOT DO... | 2001/11/16 | alan222 |
| EM | alan222_... | 2001-11-... | 3968 | NOT DO... | 2001/11/16 | alan222 |
| EM | alan222_... | 2001-11-... | 3624 | NOT DO... | 2001/11/16 | alan222 |
| EM | alan222_... | 2001-11-... | 5816 | NOT DO... | 2001/11/16 | alan222 |
| EM | alan222_... | 2001-11-... | 1528 | NOT DO... | 2001/11/16 | alan222 |
| EM | alan222_... | 2001-11-... | 35256 | NOT DO... | 2001/11/16 | alan222 |
| EM | alan222_I... | 2001-11-... | 13280 | NOT DO... | 2001/11/16 | alan222 |
| EM | alan222_... | 2001-11-... | 2792 | NOT DO... | 2001/11/16 | alan222 |
| EM | alan222_... | 2001-11-... | 9768 | NOT DO... | 2001/11/16 | alan222 |
| EM | alan222_... | 2001-11-... | 768 | DOWNLO... | 2001/11/16 | alan222 |

SECURE FILE TRANSFER AND SECURE FILE TRANSFER PROTOCOL

RELATED APPLICATION DATA

This application claims the benefit of and priority under 35 U.S.C. §119(e) to U.S. patent application Ser. No. 60/347,849, filed Oct. 25, 2001, entitled "Secure File Transfer Protocol," which is incorporated herein by reference in its entirety.

BACKGROUND OF THE INVENTION

1. Summary of the Invention

This invention generally relates to file transfers and more specifically, the transfer of encrypted files. In particular, the invention relates to an integrated system allowing user authentication, file encryption, file transfer and file decryption.

2. Description of Related Art

Many systems and methods are available that allow the transfer of electronic files. Furthermore, numerous technologies are available that allow varying degrees of encryption for files such as documents, presentations, data, or the like. For example, to facilitate the transfer of electronic files, a user will typically install a client, such as an FTP (File Transfer Protocol) client that supports a communication protocol that allows the transferring of files between one or more computers. Likewise, to encrypt a file, a user must typically purchase a stand alone encryption program that allows for the encryption of numerous types of electronic data. Generally, both types of these programs are both platform dependent and require all parties involved to be using the same software.

SUMMARY OF THE INVENTION

An exemplary embodiment of this invention allows platform independent file transferring and encrypting/decrypting in an integrated solution. Furthermore, the exchange of encryption keys can be handled through, for example, a secure socket connection between the client and a server thus removing the requirement for any intervention for key exchange from the sending and/or receiving parties.

Specifically, and in accordance with exemplary embodiment of this invention, a system and method are provided that allow the transfer of encrypted files to a destination computer without intervention required by the end user to decrypt the files. In particular, a user is able to use a single user identification, that will be associated with the files to be transferred, to retrieve, decrypt and store the files on the user's machine. Thus, a single system is capable of integrating user authentication, file encryption, file transfer, file transfer protocols and file decryption.

Accordingly, aspects of the present invention relate to the transferring of information.

Aspects of the present invention also relate the encrypting/decrypting of the information, such as data files.

Aspects of the present invention additionally relate to providing a bundled file transfer and encryption/decryption protocol.

Aspects of the present invention further relate to providing a secure delivery method for files between a secure site and another computer.

These and other features and advantages of this invention are described in or are apparent from the following detailed description of the embodiments.

BRIEF DESCRIPTION OF THE DRAWINGS

The embodiments of the invention will be described in detail, with reference to the following figures wherein:

FIGS. 2-9 illustrate exemplary graphical user interfaces associated with an exemplary operational embodiment of the invention;

DETAILED DESCRIPTION

Figure 1:
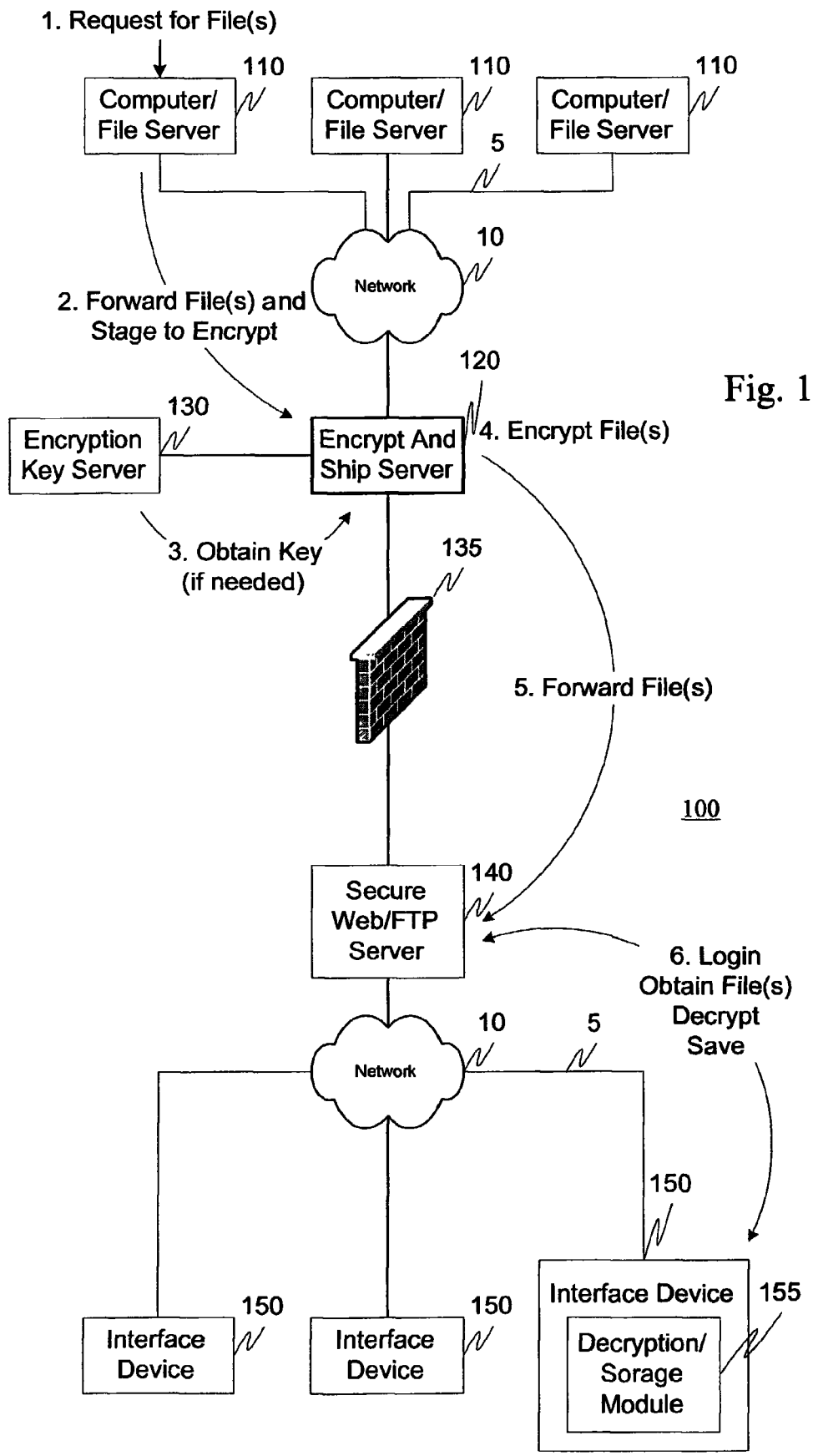
FIG. 1 is a functional block diagram illustrating an exemplary file transfer system according to this invention.

Exemplary embodiments of the invention enable the file transfer system to be built as two components. The first component is the server. The server component includes, for example, a process that is constantly monitoring a staging area watching for files to encrypt. Once a file is place in the staging area, it will be detected by the encrypting process. The encrypting process determines if an encryption key for that file is available, for example, for a given time period, such as that day. All files for a given encryption group can use the same encryption key for that predetermined time period. If no key is found, a new key can be generated and inserted into the key database. This key can then be used to encrypt the file(s) that were received in the staging area. After the file has been encrypted, the file can be sent from the staging area to a FTP server, for example, on an opposite side of a firewall.

The second component is the client component that operates in, for example, one of two modes: attended mode and unattended mode. For either mode, upon initiation, for example, a HTTPS protocol utilizing, for example, a secure socket layer (SSL) allows a user to logon to a secure web/FTP server. After authentication, one or more parameters associated with the user are retrieved from a database (not shown) at the secure web/FTP server and returned to the client machine. If the user is operating in attended mode, the user can receive a list of files available for retrieval. The user is then given the option to select one or more files for retrieval. When the user requests the download, an FTP session can be initiated to the server to retrieve the requested files. After the files have been retrieved, using, for example, the SSL link, the decryption key can be retrieved from the server and the client process will decrypt and store the files on the client's machine. In unattended mode, after logging on, for example the most recent days files for that user can be retrieved via the FTP link and be decrypted according to, for example, the steps outline above.

The exemplary systems and methods of this invention will be described in relation to the transferring of secure information. However, to avoid unnecessarily obscuring the present invention, the following description omits well-know structures and devices that may be shown in block diagram form or otherwise summarized, such as processors, memory, I/O controllers, communication links, and the like. For the purpose of explanation, numerous specific details are set forth in order to provide a thorough understanding of the present invention. It should be appreciated however that the present invention may be practiced in a variety of ways beyond the specific details set forth herein. For example, the systems and methods of this invention can generally be configured to run on any type of computer operating system and operate over any type of communication system including wireless and/or wired communication systems, or a combination thereof.

Furthermore, while the exemplary embodiments illustrated herein show the various components of the file transfer system collocated, it is to be appreciated that the various components of the file transfer system can be located at distant portions of one or more distributed networks, such as telecommunications network and/or the Internet, or within a dedicated file transfer system. Thus, it should be appreciated that the components of the file transfer system can be combined into one or more devices or collocated on a particular node of distributed network, such as telecommunications network. It will be appreciated from the following description and for reasons of computational efficiency, that the components of the file transfer system can be arranged at any location within a distributed network without affecting the operation of the system.

Furthermore, it should be appreciated that the various links connecting the elements can be wired or wireless links, or any combination thereof, or any other known or later developed element(s) that is capable of supplying and/or communicating data to and from the connected elements. Additionally, the term module as used herein can refer to any known or later developed hardware, software or combination of hardware and software that is capable of performing the functionality associated with that element.

FIG. 1 illustrates an exemplary file transfer system 100. The file transfer system 100 comprises one or more computer/file servers 110, an encrypt and ship server 120, and encryption key server 130, a secure web/FTP server 140, and one or more interface devices 150, all interconnected by links 5 and one or more networks 10. Furthermore, the file transfer system 100 can comprise one or more firewalls 135. While the exemplary embodiments of this invention will be described in relation to servers and interface devices, it is to be appreciated that any type computer and/or hardware/software can perform the disclosed functions. For example, the interface device 150 can be a computer, or any other type of interface device such as a PDA, dedicated file retrieval and decryption appliance, wired or wireless telephone, remote access device, or the like.

In operation, a request for files is received at one of the computer/file servers 110. For example, the request for files can originate from any location and/or be automated such that, for example, at the beginning of every day one or more files are selected for encryption and transfer. This selection can be based on a manual selection criteria or, alternatively, for example, a profile which automatically selects one or more files based on, for example, a certain company's records, or the like.

Table 1 illustrates a profile that could reside on one or more of the computer/file servers 110 and specifies which files are to be selected for encryption and transfer. For example, the profile can specify files that are associated with various telecommunications records associated with a plurality of users.

| Hourly | Daily | Weekly | Monthly | Dynamically |
|---|---|---|---|---|
| Company X All files | User A None unless Request Recieved Company Z Specific Users | Company Y Long Distance Information | Company X Summary Reports Company A Billing Information | User M Long Distance Call Log if Call > $100 Company D Dropped Call/Week (if any) |
|  |  | User T Usage |  | User O Every $3^{rd}$ Month |

-continued

| Hourly | Daily | Weekly | Monthly | Dynamically |
|---|---|---|---|---|
|  |  | Reports |  | forward All Reports Company E Send Specific Reports to Specified Destination if From Specific Entity and All Other Requests to $2^{nd}$ Destination |

Upon selection of one or more files from the computer/file server 110, either manually, by a profile, or some combination thereof, the selected files are forwarded via link 5 and network 10 to the encrypt and ship server 120. The encrypt and ship server 120 determines whether an encryption key for the selected file(s) is available. If an encryption key is available, the key is used to encrypt the files. Otherwise, if a key is not available, a new encryption key is generated by the encryption server 130 and, for example, stored locally at the encryption server 120 in a database (not shown). Then, once the encryption keys are obtained, the selected files(s) are encrypted and the encrypted files forwarded via, for example, firewall 135, to the secure web/FTP server 140.

Once the encrypted files are stored on the secure web/FTP server 140, they are available for download, for example, via a user interface device 150. Specifically, after a user successfully logs on via interface device 150, the interface device 150 communicates with the secure web/FTP server 140 to determine the files that are available for that user based on the user login. A user can then automatically download a pre-selected group of files or manually select individual or groups of files to be downloaded. Having downloaded the selected file(s) to the interface device 150, the decryption/storage module 155 obtains the decryption key associated with that user from the secure web/FTP server 140 and decrypts and stored the file(s). A notification can then be returned to, for example, the FTP server and relayed back to, for example, one or more of the originating computer/file server 110 and/or requester of the file that the file has been transferred and successfully decrypted.

Figures 2, 3:
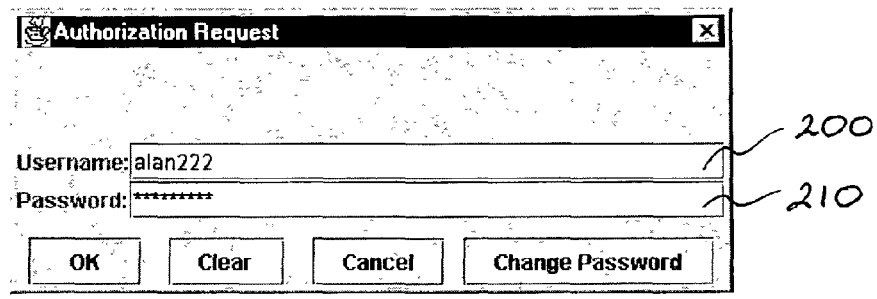
Figure 4:
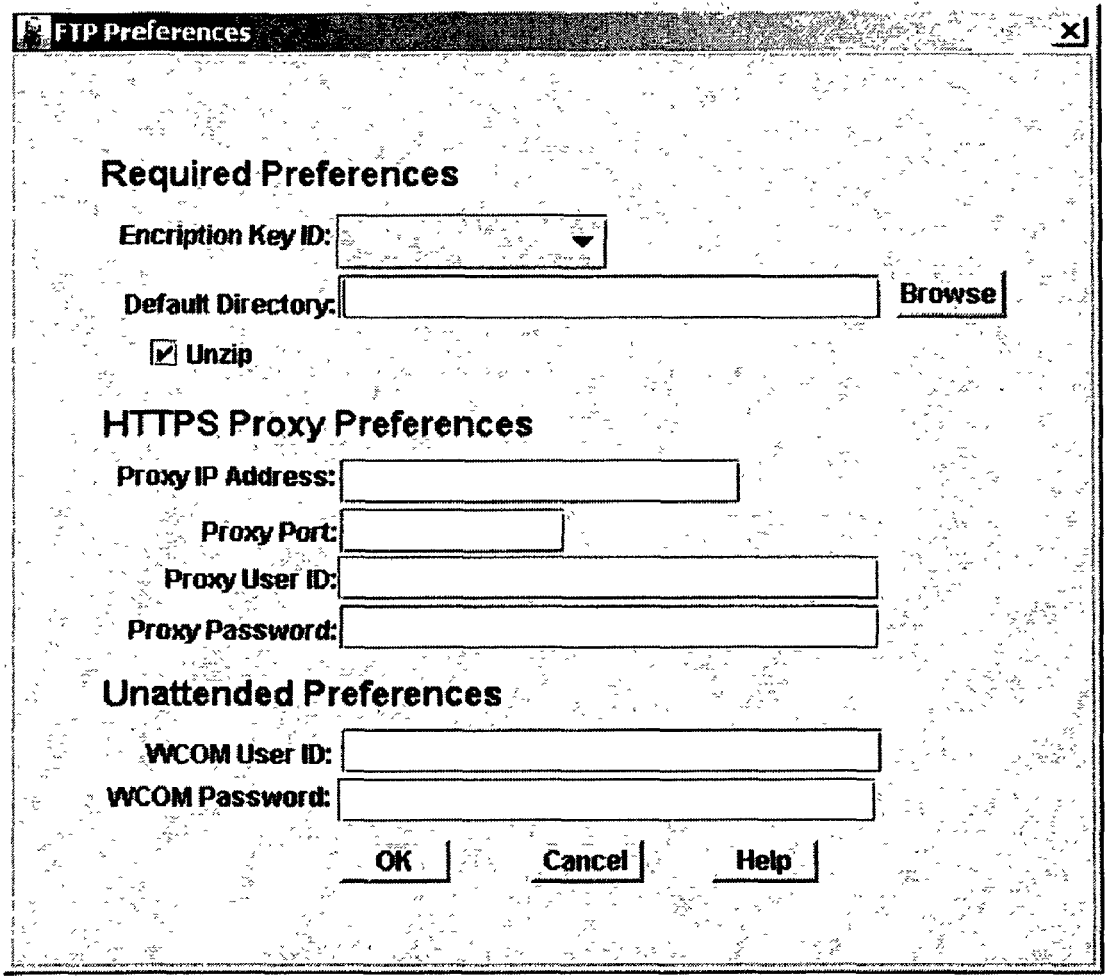

FIGS. 2-9 illustrate exemplary user interfaces that can be displayed to a user at the interface device 150. In particular, the user interface illustrated in FIG. 2 presents a user name dialog box 200 and password dialog box 210. As previously discussed, upon entry of the user name and password, the user interface device 150 displays the files available for download in user interface 300. Specifically, various information about the available files can be presented in the user interface 300 such as the file name, date created/updated, size, statues, i.e., downloaded, new, updated, or the like. A user can then select, via, for example, the click of a mouse, one or more of the files to download. A user can then select via user interface 400, the preferences for the download including, for example, the default directory in which to store the files, whether the files are to be unzipped, the proxy preferences, and, if, the file transfer system is to be used in unattended mode, a user identification and password.

Figure 5:
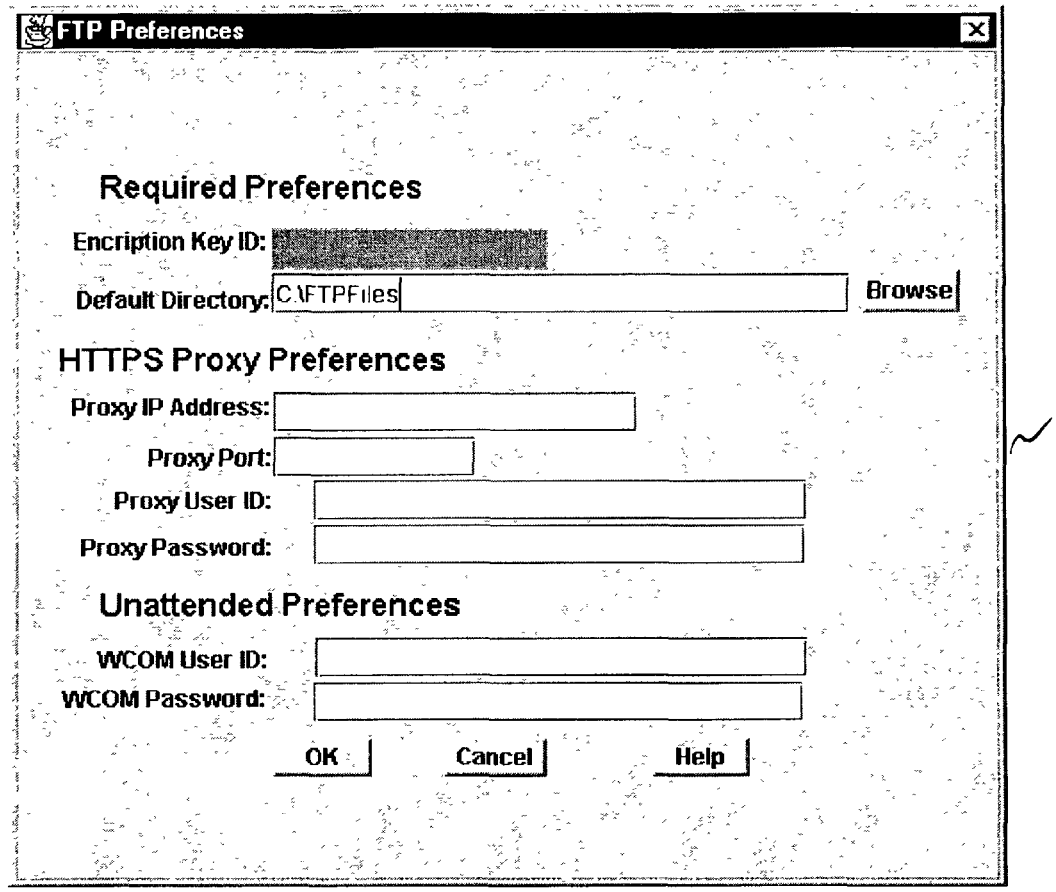
Figure 8:
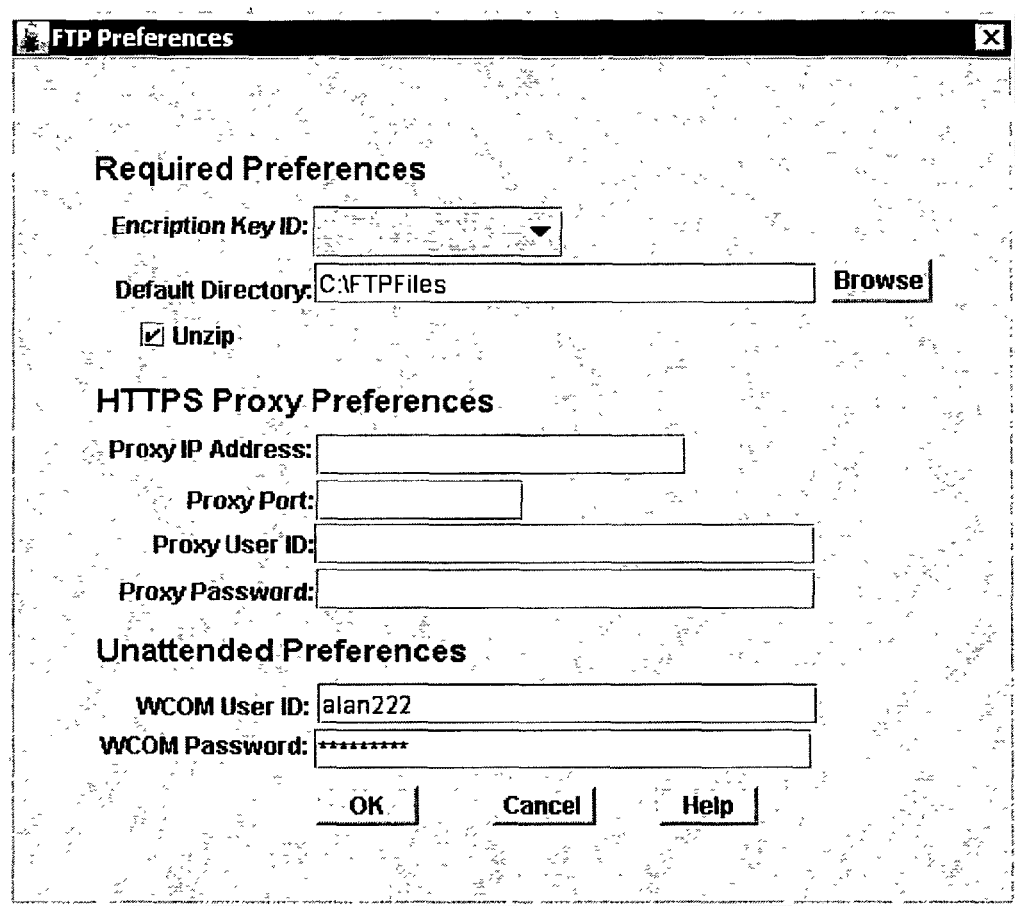
Figure 9:
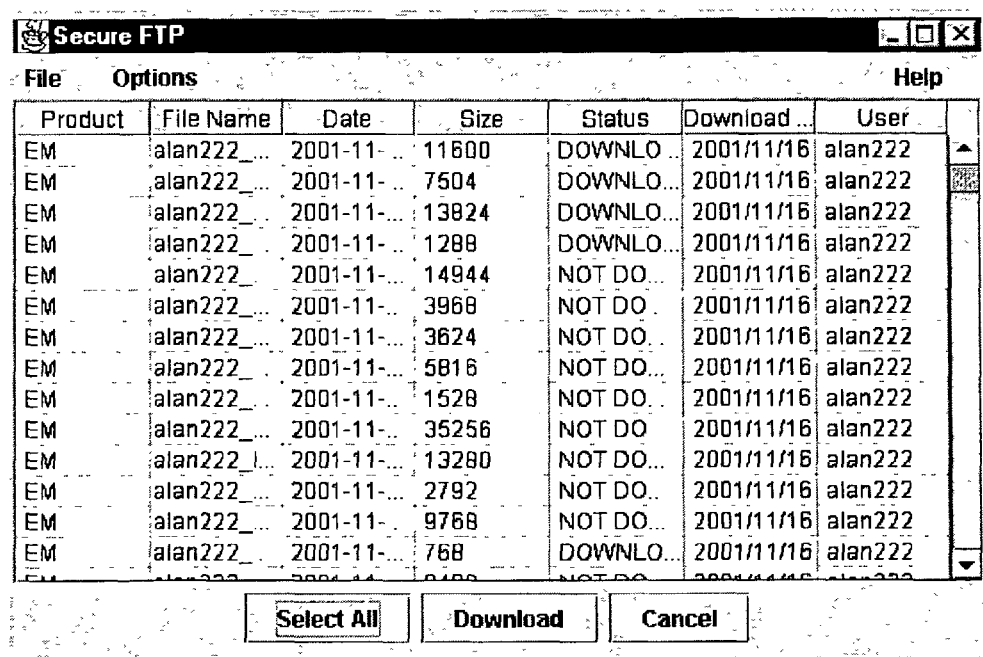

For attended mode, the user manually configures items, such as the default directory, as illustrated in the user interface 500 in FIG. 5, for the selected files. Next, utilizing the user interface 300 illustrated in FIG. 6, one or more files are selected for download. A user then clicks on the download button to retrieve and decrypt the selected files.

Alternatively, a user can be presented with a user interface 300 displayed in FIG. 7. Upon configuring the preferences interface 500 in FIG. 8, the user configures the file transfer system for unattended downloads, of, for example, all available files or a predetermine selection of files. Upon commencing the execution of unattended mode, the selected files are automatically retrieved from the secure web/FTP server, and the status of those download files shown in the user interface 600 illustrated in FIG. 9.

Figure 10:
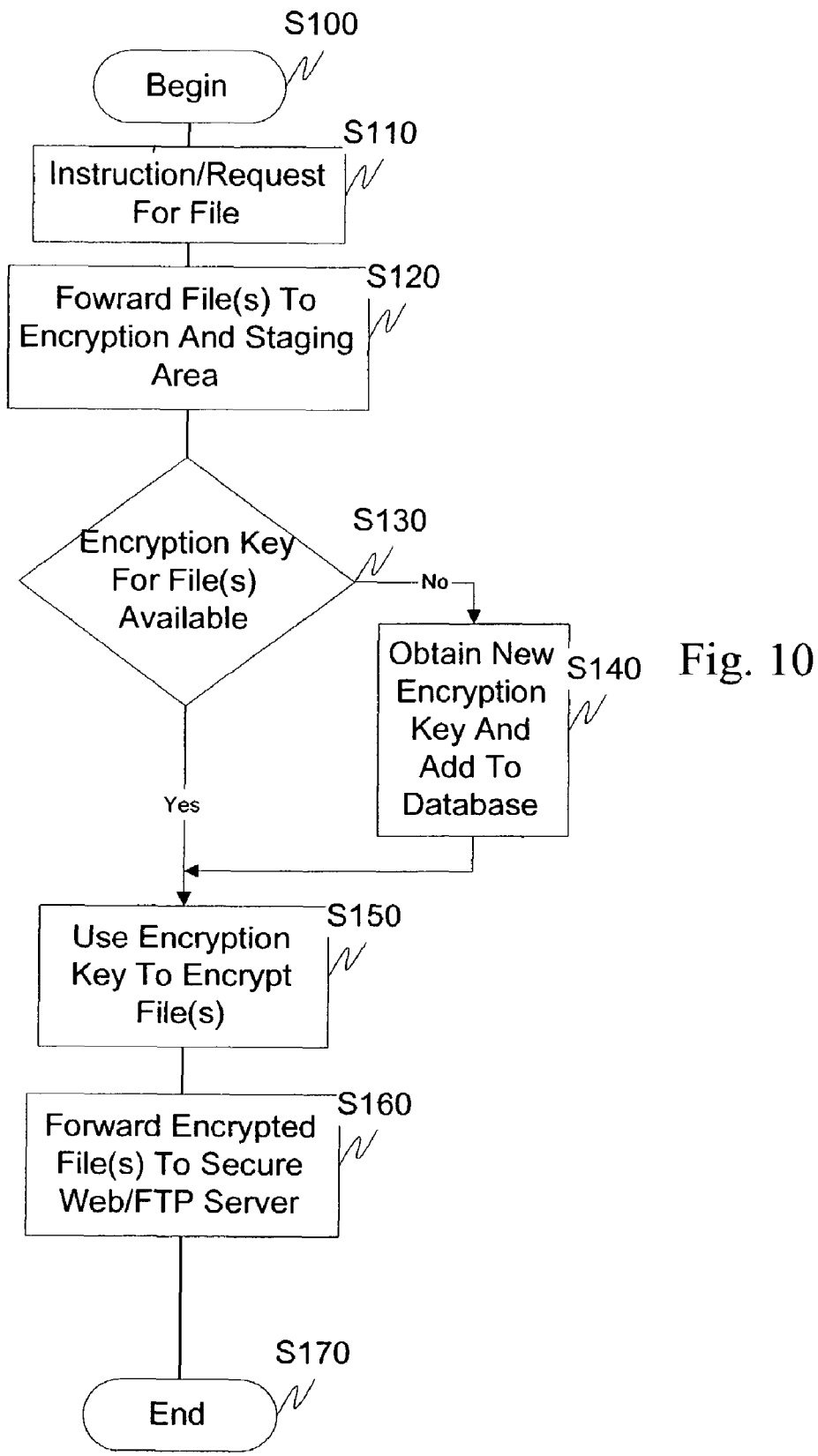
FIG. 10 is a flowchart outlining an exemplary method for encrypting files according to this invention.

FIG. 10 illustrates and exemplary method of staging and encrypting files according to this invention. In particular, control begins in step S100 and continues to step S110. In step S110, an instruction and/or request for one or files is received. Next, in step S120 the selected file(s) are forwarded to an encryption and staging area. Then, in step S130 a determination is made whether an encryption key is available for the one or more selected files. For example, the key can be any type of currently known or later developed key that allows the encrypting/decrypting of information. For example, the key can be based on a symmetric, asymmetric or public/private key type system, or the like.

If an encryption key is available, control jumps to step S150. Otherwise, control continues to step S140 where a new encryption key is obtained and added to the encryption server database. Control then continues to step S150.

In step S150, the encryption key is used to encrypt the one or more selected files. Next, in step S160, the encrypted files and the key are forwarded to the secure web/FTP server. As discussed herein after, the requested file(s) can have an identifier embedded therein that identifies the key(s) that should are to be used for the decryption. Control then continues to step S170 where the control sequence ends.

Figure 11:
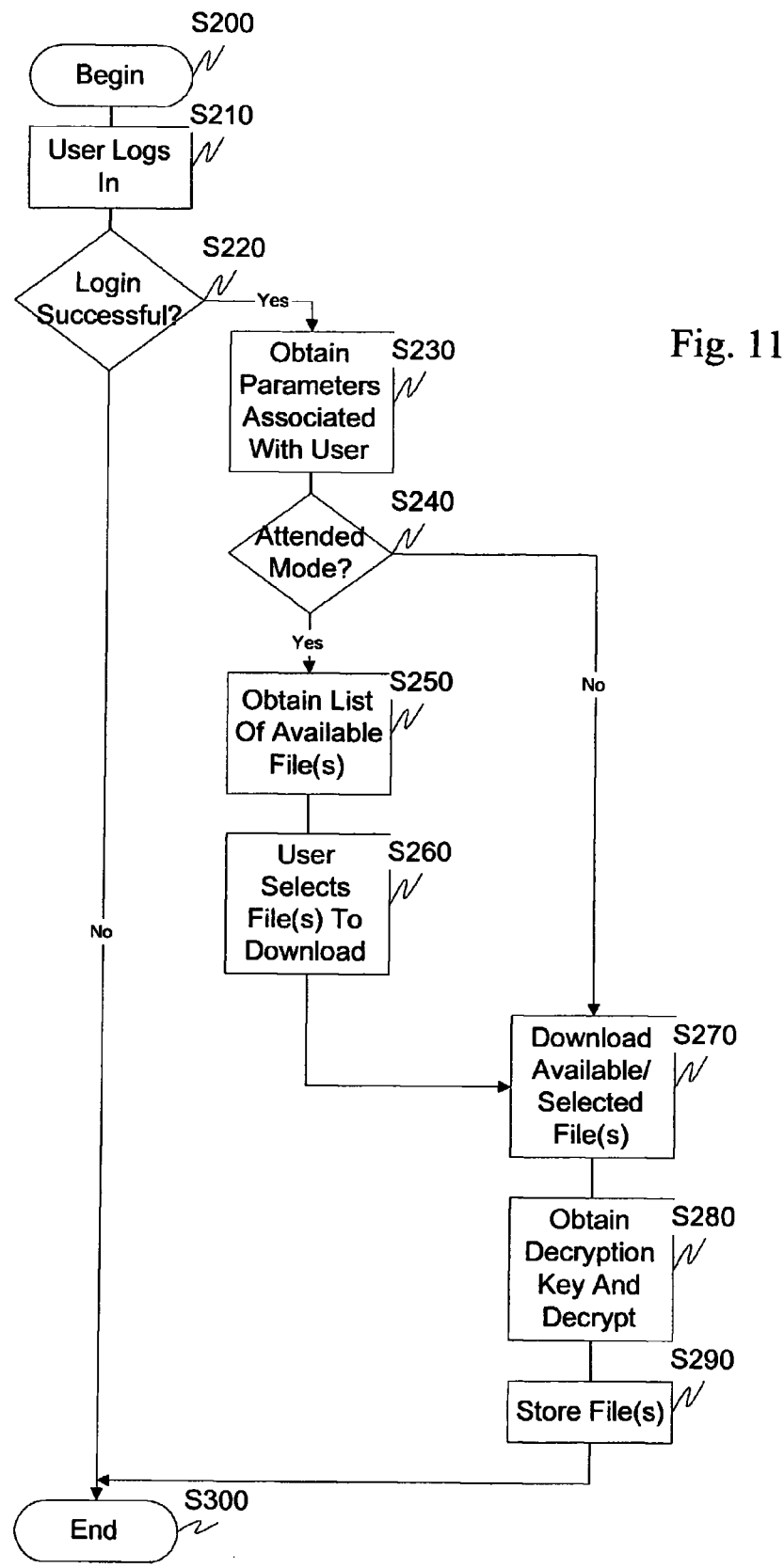
FIG. 11 is a flowchart illustrating an exemplary method of obtaining and decrypting files according to this invention.

FIG. 11 illustrates an exemplary method of obtaining encrypted files according to this invention. In particular, control begins in step S200 and continues to step S210. In step S210, a user logs in by providing, for example, a user name and password. Next, in step S220, a determination is made whether the login was successful. If the login was successful, control continues to step S230. Otherwise, control jumps to step S300 where the control sequence ends.

In step S230, parameters associated with the user are obtained. For example, these parameters can include the default directory for storing files, where the user desires the downloaded files to be unzipped, proxy preferences, attended or unattended mode selection, and the like. Next, in step S240, a determination is made whether attended mode has been selected. If attended mode has been selected, control continues to step S250. Otherwise, control jumps to step S270.

In step S250, a list of available files is obtained. Next, in step S260 the user manually selects one or more files to download. Control then continues to step S270.

In step S270, the available files are downloaded if the user has selected unattended mode, and selected files downloaded if the user has selected attended mode. However, as previously discussed, it is to appreciated that in unattended mode the user can specify, for example, a particular set of files that are to be download on, for example, a regular basis based on a profile. Control then continues to step S280.

In step S280, a decryption key is obtained, via, for example, a SSL link from the secure web/ftp server, and the files decrypted. For example, the requested file(s) can have an identifier embedded therein that identifies the key(s) that should also be obtained from the secure web/FTP server. This identifier could be static or, for example, dynamic based on,
for example, a user ID, enterprise ID, date, date associated with file, requested files, or the like. Alternatively, the key(s) could be stored in a remote location and the identifier contain information, such as an IP address, and an key identifier that would allow retrieval of the necessary decryption key(s). Next, in step S290, the files are stored in, for example, the default directory specified by the user and, optionally, a return notification set to the FTP server and optionally back to the requesting entity that placed or instructed the placement of the one or more selected files in the staging area. Control then continues to step S300 where the control sequence ends.

As illustrated in the figures, the file transfer system can be implemented either on a single programmed general purpose computer, a separately programmed general purpose computer, or a combination thereof. However, the file transfer system can also be implemented on a special purpose computer, a programmed microprocessor or microcontroller and peripheral integrated circuit elements, an ASIC, or other integrated circuit, a digital signal processor, a hard-wired electronic or logic circuit such as a discrete element circuit, a programmable logic device, such as PLD, PLA, FPGA, PAL, or the like. In general, any device capable of implementing a state machine that is in turn capable of implementing the flowcharts illustrated herein can be used to implement the file transfer system according to this invention.

Furthermore, the disclosed methods may be readily implemented in software using object or object-oriented software development environments that provide source code that can be use on a variety of computer, server, and/or workstation hardware platforms. Alternatively, the file transfer system may be implemented partially or fully in hardware using standard logic circuits or VSLI design. Whether software or hardware is used to implement the systems in accordance with this invention is dependent on the speed and/or efficiency requirements of the system, the particular function, and the particular software and/or hardware systems or microprocessor or microcomputer and telecommunications systems being utilized. The file transfer system however, can be readily implemented in hardware and/or software using any known or later developed systems or structures, devices, and/or software by those of ordinary skill in the applicable arts from the function description provided herein, and with a general basic knowledge of the computer and telecommunications arts. Moreover, the disclosed methods may be readily implemented as software executed on a programmed general purpose computer, a special purpose computer, a microprocessor, or the like. In these instances, the methods and systems of this invention can be implemented as a program embedded in a telecommunications and/or computer system such as a Java® or CGI script, applet, servlet, as a resource residing on a server or graphic workstation, as a routine embedded on a dedicated file transfer system, or the like. The file transfer system can also be implemented by physically incorporating the system into a software and/or hardware system such as the hardware and software system of a computer and associated interface device.

It is therefore apparent that there has been provided in accordance with the present invention, a file transfer system and protocol. While this invention has been described in conjunction with a number of illustrative embodiments, it is evident that many alternatives, modifications, and variations would be or are apparent to those of ordinary skill in the applicable arts. Accordingly, the disclosure is intended to embrace all such alternatives, modifications, equivalents and variations that are within the spirit and scope of this invention.

We claim:

1. An encrypted file transfer system comprising:
a user interface;
a secure server that at least stores one or more encrypted files; and
a decryption module,
where the user interface communicates with the secure server to download one or more identified encrypted files based on a user profile,
where the user profile includes an identification of the one or more identified encrypted files to be downloaded via the user interface, and
where the decryption module obtains a decryption key based on an identifier associated with the one or more identified encrypted files, and decrypts the one or more identified encrypted files.

2. The system of claim 1, wherein the decryption module stores the one or more identified encrypted files.

3. The system of claim 1, wherein the user profile specifies at least one of a user, a download interval, or a download method.

4. The system of claim 1, wherein a user logs in to the secure server based on a user identification and a password.

5. The system of claim 1, wherein the decryption key is obtained via a secure socket layer (SSL) connection.

6. A method for encrypted file transfer comprising:
communicating with a secure server via a user interface device to download one or more identified encrypted files based on a user profile,
where the user profile includes an identification of the one or more identified encrypted files to be downloaded via the user interface device;
obtaining, from a server, a decryption key based on an identifier associated with the one or more identified encrypted files; and
decrypting, by the user interface device, the one or more identified encrypted files.

7. The method of claim 6, further comprising storing the one or more identified encrypted files on a user computer.

8. The method of claim 6, wherein the user profile specifies at least one of a user a download interval, or a download method.

9. The method of claim 6, further comprising logging on to the secure server based on a user identification and a password.

10. The method of claim 6, wherein the decryption key is obtained via a secure socket layer (SSL) connection.

11. A method for encrypted file transfer comprising:
receiving, by one or more servers, a request to forward one or more stored files;
receiving, by the one or more servers, the one or more stored files and determining if a key is available for the one or more stored files;
obtaining, by the one or more servers, a new encryption key if the key is not available;
encrypting, by the one or more servers, the one or more stored files;
associating, by the one or more servers, a key identifier with the one or more encrypted files;
forwarding, by the one or more servers, the one or more encrypted files and the key identifier to at least one secure destination;
communicating with a secure server via a user interface device to download one or more of the one or more encrypted files based on a user profile,
where the user profile includes an identification of the one or more identified encrypted files to be downloaded via the user interface device;
obtaining, by the user interface device, a decryption key based on the key identifier associated with the one or more identified encrypted files; and
decrypting, by the user interface device, the one or more identified encrypted files.

* * * * *